J. C. ZOLL.
WHEEL BLOCK FOR AUTOMOBILES.
APPLICATION FILED APR. 2, 1913.
1,088,051.
Patented Feb. 24, 1914.
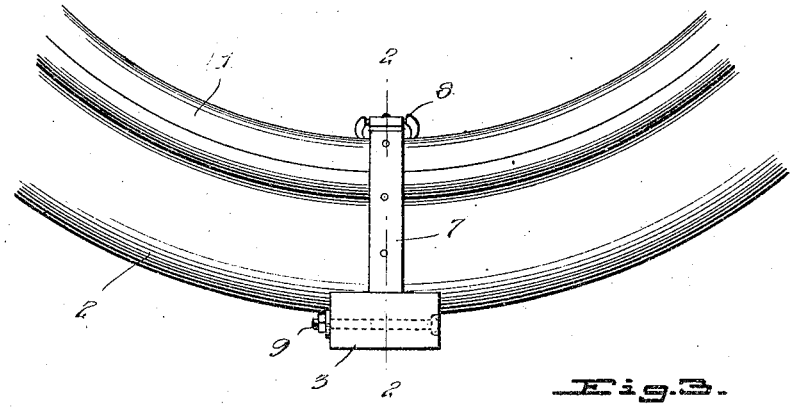
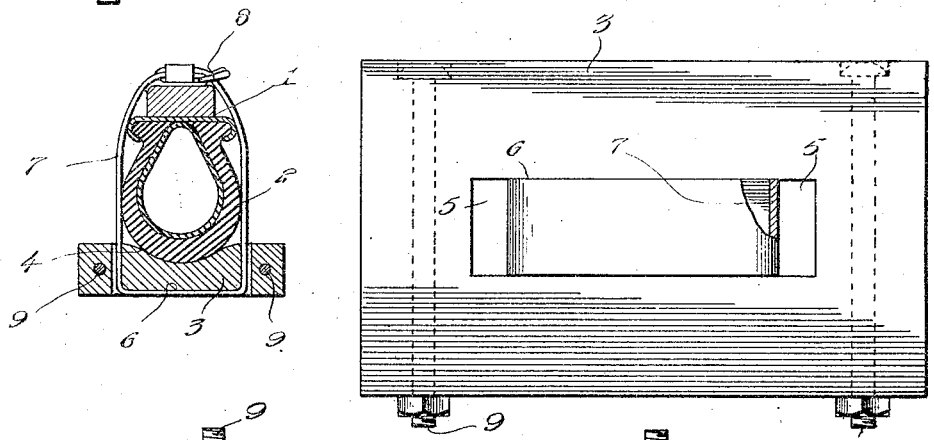
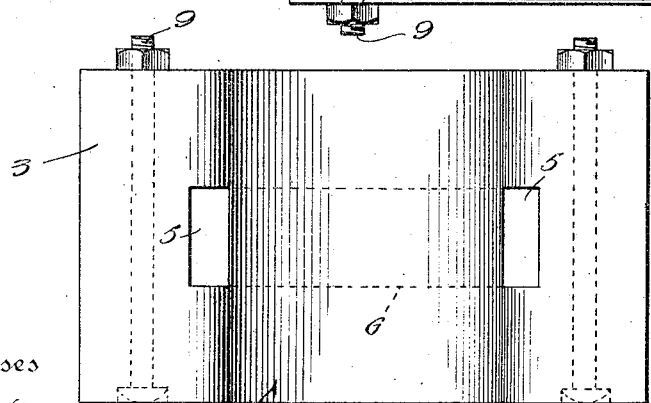
Witnesses
Inventor
J. C. Zoll.
By
Attorneys

UNITED STATES PATENT OFFICE.

JOHN C. ZOLL, OF NORTHSTAR, MICHIGAN.

WHEEL-BLOCK FOR AUTOMOBILES.

1,088,051.  Specification of Letters Patent.  Patented Feb. 24, 1914.

Application filed April 2, 1913. Serial No. 758,360.

*To all whom it may concern:*

Be it known that I, JOHN C. ZOLL, a citizen of the United States, residing at Northstar, in the county of Gratiot, State of Michigan, have invented certain new and useful Improvements in Wheel-Blocks for Automobiles; and I do hereby declare the following to be a full, clear, and exact description of the invention, such as will enable others skilled in the art to which it appertains to make and use the same.

The present invention is directed to improvements in wheel blocks for automobiles, and has for its object to so construct a device of this character that it may be easily and quickly attached to or removed from the wheel.

A further object of the invention is to provide a device of this character so constructed that when attached to the wheel the same will be prevented from slipping when traveling over muddy roads.

A still further object of the invention is to construct a device of this type which is applied to one of the drive wheels of an automobile so that the same can grip the soil to start the automobile should it become stalled.

With these and other objects in view, this invention resides in the novel features of construction, formation, combination and arrangement of parts to be hereinafter more fully described, claimed and illustrated in the accompanying drawing, in which:—

Figure 1 is a side elevation of a portion of a wheel and tire showing the device in place thereon. Fig. 2 is a sectional view on line 2—2 of Fig. 1. Fig. 3 is a bottom plan view of the block. Fig. 4 is a top plan view of the same.

Referring to the drawing, the numeral 1 designates a portion of the rear wheel of an automobile, and 2 the usual pneumatic tire. The block is rectangular in shape and is formed from wood, and has its upper surface formed with a transverse gradually rounded groove 4, which is engaged by the tire 2 when the device is attached to the wheel. A pair of slots 5 are formed in the block 3 and have one of their ends opening adjacent the sides of the groove 4, and their other ends intersecting with the ends of the longitudinal groove 6 formed in the outer surface of the block. The strap 7 is passed through the slots 5 and has a portion of its length engaged in the groove 6, the depth of which is such that the strap will have its outer surface on a plane with the outer surface of the block. To one end of the strap is attached a buckle 8 which engages the other end of the strap in the usual manner, thereby providing a device which can be easily and quickly attached to or removed from the wheel.

As the blocks are made from wood it is probable that there would a tendency to split from constant use, and to prevent this, bolts 9 are provided, and are passed transversely through the blocks, and adjacent the ends thereof.

From this construction it will be seen that a device of this type has been produced which being made from wood is extremely light, yet performing the desired function in an efficient and practical manner.

It is obvious that the block 3 can be formed from metal, hard rubber, or any suitable material.

What is claimed is:—

In combination with a wheel rim having a pneumatic tire thereon, of a block having one of its surfaces formed with a transverse groove for engagement with the tire, and its outer surface provided with a longitudinal groove, slots extending through the block and opening at their inner ends at the ends of the grooves, a strap engaging said slots and having a portion of its length resting in the longitudinal groove, said strap having its end buckled to engage the rim to hold the block upon the tire.

In testimony whereof, I affix my signature, in the presence of two witnesses.

JOHN C. ZOLL.

Witnesses:
R. L. SEBRING,
E. P. CROFT.